ELECTRON BEAM FOCUSING AND DEFLECTION ELECTRODE SYSTEM

Filed July 14, 1965

2 Sheets-Sheet 1

Inventor:
William E. Glenn Jr.,
by Richard R. Brainard
His Attorney.

ELECTRON BEAM FOCUSING AND DEFLECTION ELECTRODE SYSTEM

Filed July 14, 1965 2 Sheets-Sheet 2

Inventor:
William E. Glenn Jr.,
by Richard R. Brainard
His Attorney.

1

3,320,468

ELECTRON BEAM FOCUSING AND DEFLECTION ELECTRODE SYSTEM

William E. Glenn, Jr., Scotia, N.Y., assignor to General Electric Company, a corporation of New York Filed July 14, 1965, Ser. No. 471,993
13 Claims. (Cl. 315—14)

The present invention is a continuation-in-part of my copending application Ser. No. 335,117, filed Jan. 2, 1964, now abandoned. The invention relates to an improved electron beam focusing and deflection system and particularly to such a system providing improved dynamic focus. The present invention is particularly suited to systems for intelligence modulating an electron beam and scanning it over an area to produce on output which conveys the intelligence.

In an electrostatic electron beam focusing and deflection system the best balance between the demagnification obtainable from the focusing system and the deflection angle required for scanning a given area is obtained by combining the focusing and deflection function in one system of electrodes. The combination of deflection and focusing voltages on a set of electrodes modifies the focusing field with the variation in deflection voltage so that the center of focus shifts in accordance with these deflection voltages. If the beam merely enters the focusing field at the center of the structure, this shifting of the center of focus in accordance with the deflection voltages causes rather severe deflection aberration at the scanned area and is detrimental, particularly in information or intelligence transducing systems. In accordance with an important aspect of the present invention, means are provided for imparting a predeflection to the beam in the same direction as the main deflection and this predeflection is of suitable magnitude so that the entry of the beam into the focusing field follows the shift in the center focus of the focusing field produced by the main deflection voltages. In other words, the predeflection tends to compensate for the distortion of the focusing field produced by the deflection voltages.

Electron beams have been modulated with intelligence signals, such as color television picture signals, for example, and scanned over an area of a light modulating medium to produce in the medium a distribution of diffraction gratings capable of deviating light and cooperating with a projection system to reproduce the information as a projected image. To produce an image of good quality requires that the beam remain well focused in both directions as it is scanned over an area and that the parameters of the modulation maintain a substantially linear relation to the corresponding parameters of the modulating signals over the scanned area. An electron beam writing and light projecting system of the general type to which my invention is particularly applicable is described and claimed in my copending application Ser. No. 119,712, filed June 26, 1961, now Patent No. 3,209,072, dated Sept. 28, 1965, and assigned to the assignee of this invention. The present invention relates to an improved and simplified electrode structure for focusing and deflecting an electron beam which is particularly applicable to systems of the above type and when so applied produces improved quality in the projected image.

In accordance with the illustrated embodiment of the present invention, the electron beam is controlled by two sets of generally rectangular electrodes having the centers of the electrodes of each set lying in a common plane transverse to the undeflected electron beam path and with the sets of electrodes longitudinally spaced along the beam. The electrodes of each set are divided into opposed pairs, one pair being utilized for horizontal deflection and modulation of the beam in accordance with color

2 component information, for example, and the orthogonally arranged pair energized to provide vertical deflection and modulation in accordance with other color information, for example. The corresponding pairs of electrodes in the second set are also energized by these deflection and color modulating voltages. The vertical and horizontal focusing fields are produced by the direct current voltages impressed between the corresponding electrodes of the two sets and between the electrodes of the set nearer the image area and an additional focusing electrode positioned between the latter electrodes and the image area. The dimensions and voltages of these electrodes are correlated to minimize aberrations and produce a sharply focused beam over the full deflection area as well as a linear relationship between the variation in the charge pattern produced at the raster area and the intelligence signals applied to the electrodes. The objects and advantages which characterize my invention will become more apparent as the following description proceeds, reference being had to the accompanying drawing, and the scope will be pointed out in the appended claims.

Figures 1, 2, 3, 5:
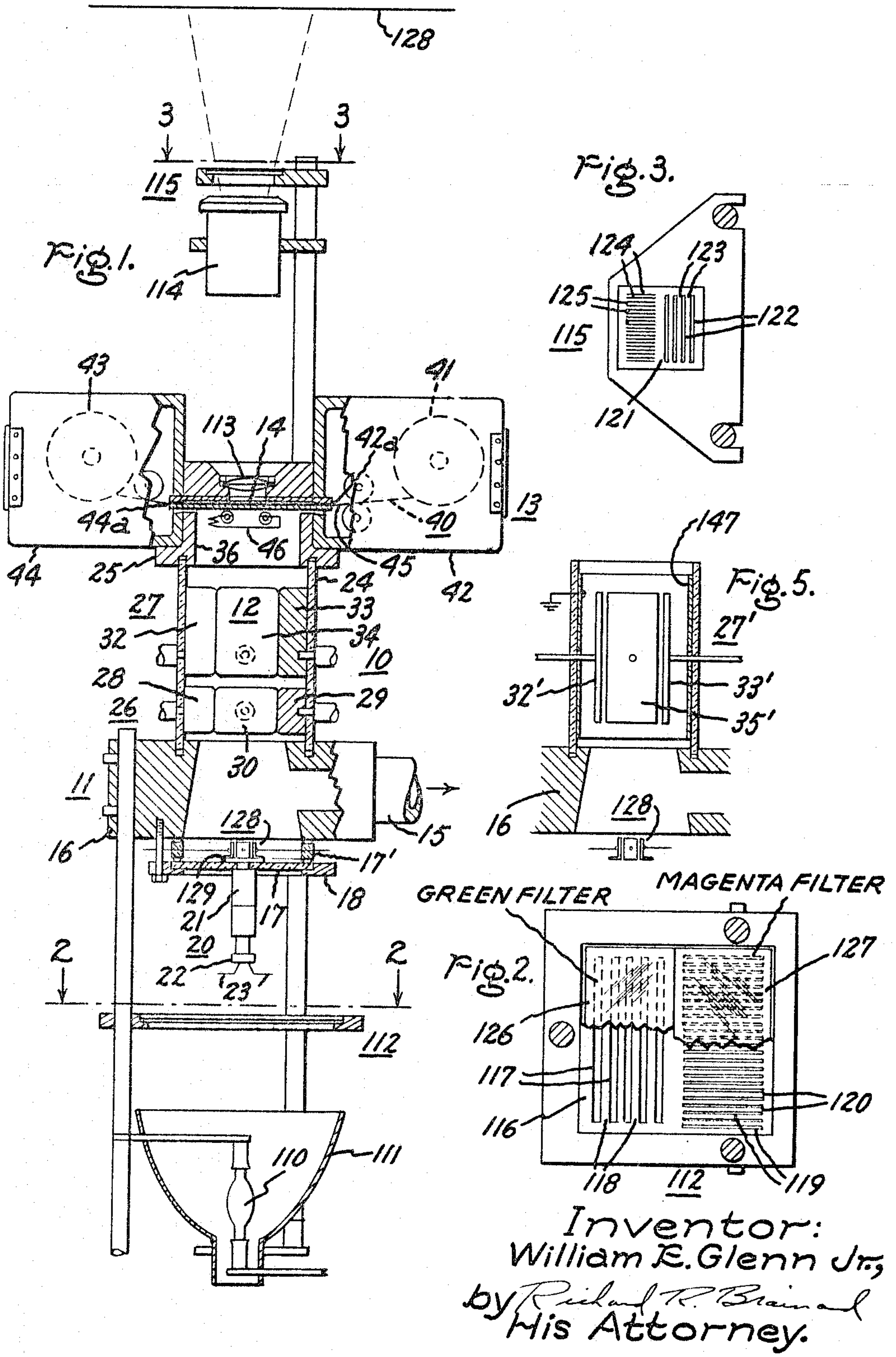
FIG. 1 is an elevational view in section illustrating an electron beam writing and light projection apparatus embodying my invention.
FIG. 2 is a sectional view, partially broken away, showing a portion of the input optical system of FIG. 1.
FIG. 3 is a sectional view taken along the lines 3—3 of FIG. 1 and showing a part of the output optics of the apparatus of FIG. 1.
FIG. 5 is an elevational ivew in section illustrating a modified electrode system embodying my invention.

Referring now to FIG. 1 of the drawing, I have shown my invention embodied in an electron beam deflection and focusing system of an apparatus for electron beam writing on a light valve medium through which light is projected to produce an image of the information written by the electron beam. As shown in FIG. 1 the apparatus includes an evacuable envelope 10 including an electron beam generating section 11, an electron beam deflection and focusing section 12, and a tape section 13 for providing in the raster area 14, a deformable light modulating medium. The sections 11, 12 and 13 together form the evacuable envelope which may be connected through conduit 15 to suitable evacuating apparatus or if desired the envelope may be sealed off and the interior of the envelope provided with suitable getting material (not shown) to assist in maintaining the vacuum.

The electron beam generating unit 11 includes a generally annular metallic housing 16 which is closed at its lower end as by insulating and transparent plate 17 preferably glass secured against the lower end of an insulating hollow cylindrical ring 17' interposed between the housing 16 and a suitable retaining ring 18 in vacuum tight relation with respect thereto. An electron gun for generating the electron beam is supported centrally from the insulating plate 17 by a nut (not shown) engaging an extension on the end of the electron gun structure 20. The electron gun includes an accelerating or anode electrode 21, a grid or control electrode terminal 22, and lead-in conductors 23 which are joined to a filamentary emitter (not shown) providing the source of electrons. Beam centering and beam cross section controlling electrodes 128 are supported adjacent the beam path near the exit from the anode electrode 21. As illustrated, these electrodes are supported from an insulating washer 129 clamped between the nut 19 and the face plate 17. As will be described in detail in connection with FIG. 4, these electrodes are energized with suitably adjustable direct current voltages which are near the ground potential of the anode electrode to center the beam and also control the relative dimensions of the beam in orthogonal directions.

The focus and deflection section of the apparatus includes a cylindrical housing 24 preferably of glass, seated in vacuum tight relation in a recess formed in the upper face in the housing 16 and also received in vacuum tight relation in a recess formed in the lower surface of a housing member 25 of the unit 13. In accordance with a feature of my invention, the deflection unit includes two sets of electrodes 26 and 27 with each set including four electrodes supported in orthogonally arranged pairs with the centers of the electrodes of each set lying substantially in a common plane transverse to the undeflected electron beam path. In the set of electrodes 26 nearer the electron source the opposed electrodes 28 and 29 are designated vertical deflecting electrodes and the second pair of opposed electrodes 30 and 31 (see FIG. 4) are orthogonally arranged with respect to electrodes 28 and 29 and may be considered horizontal deflection electrodes. Similarly in the second set of electrodes 27, electrodes 32 and 33 may be considered vertical deflection electrodes and electrodes 34 and 35 (see FIG. 4) may be considered horizontal deflection electrodes. As will become apparent from a consideration of the operation of the system in connection with the description of FIG. 4, these sets of electrodes 26 and 27 in cooperation with the generally cylindrical electrode 36 provided by the lower end of housing 25 also provide the longitudinally spaced electrodes of a three electrode electrostatic focusing lens system.

Figure 4:
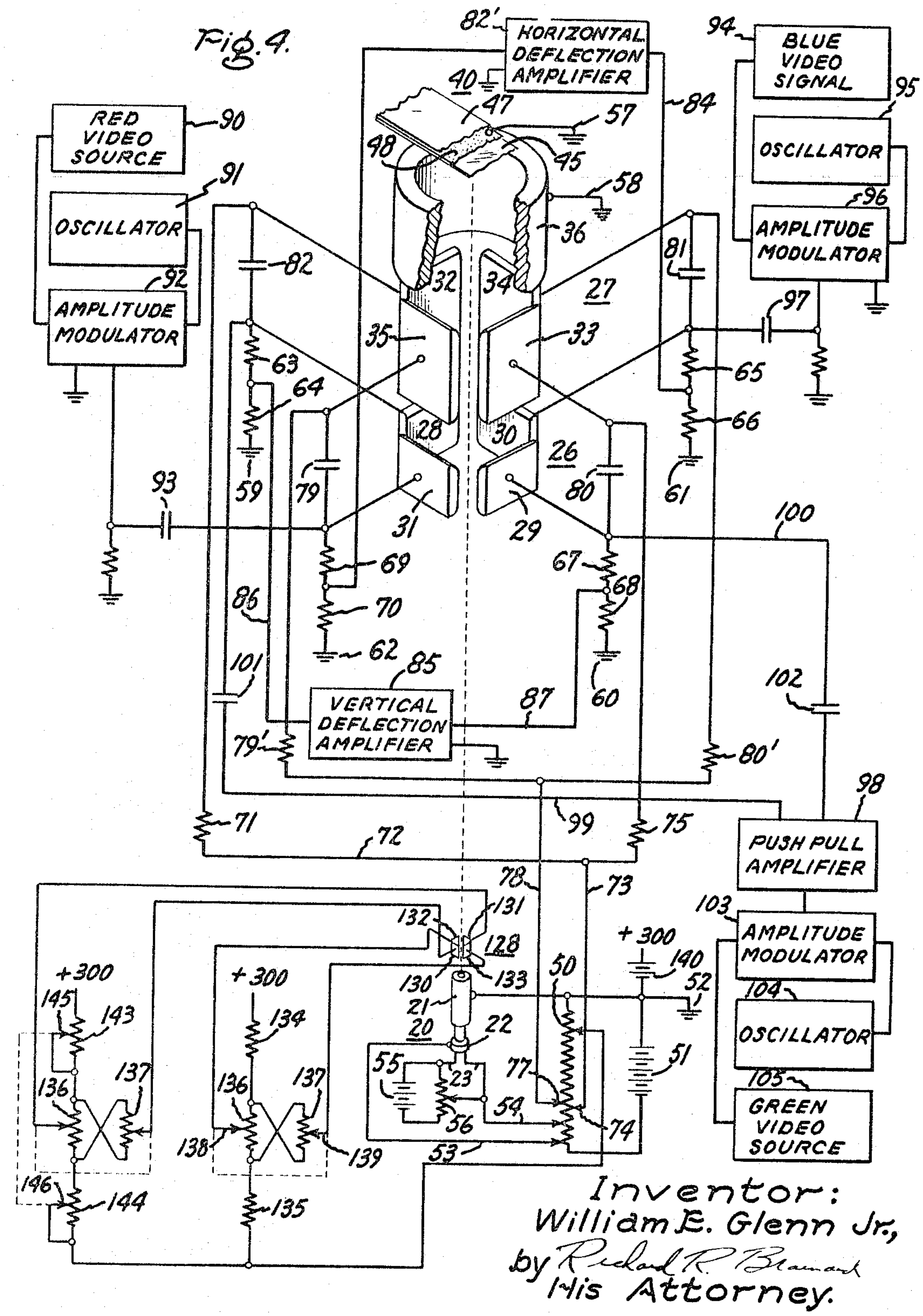
FIG. 4 is a schematic illustration of an electrode system embodying my invention and energized by color video signals to produce a deformation pattern on a light modulating medium capable of reproducing the color television picture.

In the particular embodiment illustrated the beam impinges on an electron receiving surface in the form of the raster area 14 of a light modulating medium provided by a tape 40 from a supply reel 41 rotatably mounted in a housing 42 secured to the housing member 25 and communicating with the interior thereof through a slot **42*a*. The tape passes from the raster area 14 onto a takeup reel 43 carried by housing 44 through a slot 44*a*. The tape is provided with a thermoplastic surface layer 45 on the side toward the electron beam which may be rendered liquid by heating and a suitable resistance electric heater illustrated at 46 is provided for this purpose. A more detailed description of a light modulating medium of this type and the manner of its use in a recorder or a projector of the general type described here is contained in my copending application Ser. No. 317,269, filed Oct. 18, 1963, now U.S. Patent No. 3,291,907, and assigned to the assignee of the present invention. As illustrated in FIG. 4 the tape is a three layer structure including a transparent plastic base 47 and a transparent conducting layer 48 between the base 47 and the thermoplastic layer 45**.

The light projection system and the manner in which it cooperates with the deformed light modulating medium to project an image corresponding to the information contained in the modulated electron beam will be described at a later point in the specification after the system for controlling the electron beam and its operation are described in connection with the schematic illustration of FIG. 4. In FIG. 4 parts corresponding to those earlier described in connection with FIG. 1 have been designated by the same reference numerals. As illustrated in FIG. 4, the direct current voltages for energizing the various electrodes of the system are obtained from taps on a voltage dividing resistor 50 connected across the terminals of a direct current voltage source illustrated schematically as a battery 51. The positive terminal of the supply is grounded as illustrated at 52 and is also connected to the anode 21 of the electron gun. The grid terminal 22 is connected with a point on the resistor 50 by conductor 53 which is negative with respect to the point of connection of conductor 54 which is connected with one of the lead-in conductors 23 to determine the direct current cathode potential. The filamentary cathode (not shown) is heated by an adjustable direct current voltage derived from battery 55 and voltage dividing resistor 56. The conducting layer 48 of the light modulating medium is maintained at ground potential by the connection 57 and likewise focusing electrode 36 is grounded as illustrated at 58 and the set of deflecting and focusing electrodes 26 is maintained at direct current ground potential. The electrodes 28–31, respectively, of the set 26 are connected to ground as shown at 59, 60, 61 and 62. Each of the circuits from the electrodes 28–31 to ground include in series a pair of resistors which have been designated by the numerals 63–70, inclusive. The electrodes of set 27 are all maintained at substantially the same direct current potential which is negative with respect to ground potential of electrode 36 and the electrode set 26. As illustrated, electrode 32 is connected through resistor 71, conductor 72 and conductor 73 to a tap 74 on resistor 50. In a similar manner electrode 33 is connected through resistor 75 and conductor 73 to the tap 74. The opposed pairs of electrodes 34 and 35 of set 27 are maintained at the potential of a tap 77 on resistor 50 by conductor 78 and branch circuits including resistors 79′ and 80′. The taps 74 and 77 are independent to permit slight adjustment in the relative voltages at which the opposite pairs of electrodes of set 27 are maintained, although it will be appreciated that they are normally operated at essentially the same position and voltage.

The individual electrodes 28–31, inclusive, of the set 26 are connected to the corresponding electrodes 32–35 of the electrode set 27 by capacitors 79–82 which isolate these electrode sets with respect to direct current voltages but effectively connect them together in pairs with respect to the deflection and modulating voltages as will be described in more detail. Horizontal deflection voltages are applied to electrodes 30 and 31 of set 26 and through capacitors 79 and 81 to electrodes 35 and 34. As illustrated a source of the deflection voltage is supplied by horizontal deflection amplifier illustrated schematically at 82′ by conductors 83 and 84 connected respectively to the junctions of resistors 69 and 70 and 65 and 66. The horizontal deflection voltages appear across resistors 66 and 70. In a similar manner vertical deflection voltage is supplied from vertical deflection amplifier 85 by conductors 86 and 87 to the junctions of resistors 63 and 64 and 67 and 68, respectively.

As will be readily appreciated by those skilled in the art, the electron gun 20 and the associated circuit as described above is effective to provide and accelerate an electron beam toward the electron receiving surface of the tape 45 which in its undeflected path passes through the center of the focusing and deflection electrodes 26, 27 and 36. The electrodes of set 26 and the cylindrical electrode 36 are the outside lens members of a three element electrostatic lens system and as illustrated are maintained at ground potential which may be equal to the final positive voltage of the electron beam. The intermediate electrode set 27 is maintained at a substantial negative voltage with respect to electrodes 26 and 36 and may, for example, be about three-quarters of the total beam voltage negative with respect to the anode as determined by taps 74 and 77 on voltage dividing resistor 50. It is apparent that this lens system will serve to focus the electron beam. In order to provide the best balance between the spot demagnification by the focusing system and the deflection angle, the focusing and deflection functions are combined in this electrode set 27. The horizontal and vertical deflection voltage sources may provide voltages of the periodicity normally used in television deflection circuits, for example. The horizontal deflection voltage is applied to the electrodes 34 and 35 of set 27 to provide the main horizontal deflection and also to the electrodes 30 and 31 of set 26 to provide a predeflection, that is the deflection of the beam before it enters the focusing field produced between the electrode set 26 and electrode set 27. In a similar manner the vertical deflection voltage is applied to the electrodes 32 and 33 of the electrode set 27 and also to the predeflection electrodes 28 and 29 of the set 26. The presence of the deflection voltages on the main deflection electrodes of set 27 produces a distortion of the focusing field or a movement of the center of focus of the focusing field. In order to minimize or eliminate the effect of this dynamic change in the focusing field, the beam is given a predeflection, that is a deflection before it enters the focusing field in the same direction as the deflection produced by the main deflection electrodes of set 27 and in an amount which tends to introduce the beam into the focusing field at the dynamic center of focus. While the amount of predeflection may be determined by a number of parameters, such as the relative magnitudes of the deflection voltages impressed on the main deflection electrode set 27 and the predeflection electrode set 26 or by employing predeflection electrodes separate from the electrode which forms the first lens electrode of the focusing system in which case the electrode set 26 may be replaced by a single circular focusing electrode, for example. In the embodiment illustrated, the amount of predeflection is determined by the length in the direction of the beam of the electrodes in set 26 as compared to the length of the electrodes in set 27 providing for the main deflection. In this embodiment the relative lengths were chosen so that the same deflection voltage could be applied to both sets of electrodes 26 and 27.

In a specific practical embodiment of the system described, the center of the three element lens which is also the center of the main deflection electrodes of set 27 is eight inches from the anode aperture and the plane of the modulating medium just beyond the focusing electrode 36 is four inches from the center of the lens. With this arrangement the main deflection electrodes of set 27 were three and one-quarter inches in the direction of the beam and were spaced a quarter of an inch from the electrodes of set 26 and from the focusing electrode 36. The focusing electrode 35 was 2⅛ inches in length in the direction of the beam and the predeflection electrodes also approximately 2⅛ inches. The distance between the opposed electrodes of the sets 26 and 27 was 2.2 inches and the inside diameter of the focusing cylinder 36 was approximately 3 inches or approximately the same as the diagonal of the deflection electrodes. In this system the anode voltage as well as the voltage of the two outside lens electrodes 26 and 36 was 10,000 volts while the focusing voltage of the center electrode set 27 was approximately 7500 volts negative with respect to the anode voltage. With this system the horizontal deflection voltage had a 15,750 repetition rate and a maximum amplitude of about 800 volts and the vertical deflection voltage had a repetition rate of about 60 cycles per second and a magnitude of 600 volts.

The centering and beam cross section control electrodes 128 are also arranged in opposed orthogonal pairs similar to the electrode sets 26 and 27. Those corresponding to the horizontal deflection electrodes and operative to center the beam in a horizontal direction are designated by the numerals 130 and 131, while those for centering the beam in a vertical direction are designated by the numerals 132 and 133. In the system illustrated, the anode is operated at ground potential and the adjustable direct current voltages applied to the centering electrodes are provided by potentiometers which provide voltages differing from one another but which are also in the vicinity of ground potential. As shown, the circuit for energizing the vertical centering electrodes 132 and 133 includes a series circuit having resistors 134 and 135 connected in series with parallel connected potentiometers 136 and 137 in series between the resistors 134 and 136. As illustrated, taps 138 and 139 of the potentiometers are mechanically coupled to be moved simultaneously and, in order that movement of these taps produce an increase in the voltage on one tap in a positive direction as the other one increases in a negative direction, the potentiometers 136 and 137 have been shown cross-connected. These taps 138 and 139 are connected respectively with centering electrodes 132 and 133. The series connected resistors and potentiometers are energized from direct current voltages which are approximately 200–300 volts above and below ground. As illustrated, the terminal of resistor 134 is indicated connected to a 300 volt positive direct current supply provided, for example, by battery 140 while the lower terminal of resistor 136 is connected by conductor 141 to an adjustable tap 142 on a potentiometer 50, this voltage also being adjusted to a position the order of approximately 300 volts negative. It is apparent that at the mid position of taps 138 and 139 the centering electrodes are at the same potential and at ground potential. Movement of the taps upwardly renders electrode 133 positive with respective to electrode 132 with the increase in positive potential electrode 133 being equal to the decrease in positive potential of electrode 132, so that midway between the two electrodes the voltage potential is essentially that of ground.

The circuit for energizing the horizontal electrodes 130 and 131 is essentially the same as that described in connection with the vertical centering electrodes 132 and 133 except that resistors 134 and 136 have been replaced by variable resistors 143 and 144 having adjustable taps 145 and 146, respectively. These taps are mechanically connected together for movement in unison so that as resistance 143 is increased, resistance 144 is decreased. This leaves the voltage across potentiometers 135 and 136 constant with the adjustment of these taps. Taps 145 and 146 make it possible to change the voltage of the horizontal electrodes 130 and 131 in either a positive or negative direction in unison relative to those of the vertical electrodes 132 and 133 to control the relative cross sectional dimensions of the electron beam.

As indicated above, it is possible to accomplish the predeflection by electrodes spaced toward the anode cylinder of the gun from the first lens electrode system 26 in which case the electrode system 26 may be a single conductive structure such as a cylinder. It will be apparent that the centering electrodes 128 may be used for this predeflection if desired. In such a case, the deflection voltages, for example, are impressed on the corresponding horizontal and vertical centering electrodes which assume the predeflection function formerly accomplished by the predeflection electrodes 26. While these centering electrodes are shorter in the length of the tube, they are closer to the electron beam and the beam has a longer travel to the main deflection electrodes 27 so that they tend to produce a greater deflection for a given voltage. For this reason, the main deflection voltages are suitably reduced in magnitude for energizing the centering electrodes. This is accomplished by a suitable voltage divider circuit (not shown) energized by the deflection voltage supplies. Also, suitable isolating capacitors are used to isolate the centering electrodes from the remaining electrodes with respect to direct current voltage. Also, it will be apparent to those skilled in the art that the deflection need not take place in two directions and that the focusing and deflection system may be applied to tape recordings, for example, in which the movement of the tape functions to provide the displacement in one direction, namely the vertical direction. In this case the horizonal deflection will be the only deflection applied and the only predeflection required will be in that direction.

In the system illustrated in FIGS. 1 and 4, provision is made for impressing information on the modulating medium according to input signals and in the specific embodiment illustrated, these signals are color television picture signals and the system of FIG. 1 provides for the projection of such color pictures. Because of the importance of a well focused small electron beam which may be deflected over a substantial angle without aberration to the successful operation of such a system, the present invention is of particular use in systems of this type. The modulation of the beam in accordance with the color information will be briefly described. Red video signals supplied by source 90 and the output of an oscillator 91 having a frequency of 16 megacycles, for example, are combined in amplitude modulator 92 to provide an output voltage of the frequency of oscillator 91 and an amplitude dependent upon the amplitude of red video signal. This voltage is impressed on the horizontal deflection plate 35 and the horizontal predeflection plate 31 through a capacitor 93 which isolates the color information circuit from the direct current voltage of the predeflection electrode 31. The resistor 69 also isolates the red video information circuit from the horizontal deflection circuit. In a similar manner the blue video signal from source 94 and the output of oscillator 95 having a suitable frequency such as 12 megacycles is combined in amplitude modulator 96 and impressed on the opposed horizontal deflection plate 34 and predeflection plate 30 through capacitor 97. The effect of these two voltages superimposed on the horizontal deflection voltage is to velocity modulate the beam in accordance with these two frequencies by amounts dependent upon the amplitudes of the red and blue video signals to provide increases and decreases in the charge density along the raster lines at spacings determined by the frequencies of the oscillators 91 and 95 and by amounts dependent upon the amplitudes of the red and blue video signals. As is well understood by those skilled in the art, this type of electron beam control produces deformations in the medium 45 capable of diffracting light and in combination with a suitable optical system to reproduce color information in a projected image. It will also be understood that voltages applied respectively to electrodes 34 and 35 and to 30 and 31 may be combined in a voltage adding circuit and applied to electrodes 34 and 35 in push-pull and also to electrodes 30 and 31 in push-pull. In a similar manner the green video information is impressed on the vertical deflection plates 32 and 33 and the predeflection plates 28 and 29 by the output of a push-pull amplifier 98 through conductors 99 and 100 and blocking capacitors 101 and 102. The push-pull amplifier 98 is energized by the output of an amplitude modulator 103 which is a voltage wave having a frequency determined by oscillator 104 and an amplitude determined by the green video signal 105. The green video signal is an inverse signal having an amplitude which is a minimum when the intensity of the green is a maximum. The frequency of the oscillator 104 is high relative to the other two oscillators 91 and 95 and may be in the order of 50 megacycles. This results in a high frequency spreading or blurring of the beam in a vertical direction at a rate sufficiently high that the resulting deformations are not resolved by the optical system used for reading out the written information and the amplitude of the high frequency voltages determines the amount of spreading of the beam and accordingly the decrease in charge density and the resulting decrease in depth of deformations on the modulating medium. The combined effect of this color modulating system is to produce orthogonal gratings capable of projecting the color information on a screen in point by point correspondence with the information written on the medium. A system of this general type is described in detail in my copending patent application Ser. No. 835,208, filed Aug. 21, 1959, and assigned to the assignee of this invention, now Patent No. 3,118,969, dated Jan. 21, 1964. The manner in which the deformed medium cooperates with an optical system to project the written information is also fully described in said application Ser. No. 835,208 and will be briefly described here in connection with FIG. 1.

The optical system for projecting a picture corresponding point-by-point with the information contained in the orthogonally arranged deformations of the light modulating medium 45 is provided by a light source 110, associated reflector 111, an input light mask assembly 112, a lens 113 located adjacent the light modulating medium and closing the upper end of the envelope 10, a projection lens assembly 114, and an output light mask 115. The input light mask 112 includes the metal plate 116 having a plurality of spaced slits 117 with interposed bars 118 in one half of the plate and a plurality of horizontally extending slits 119 with interposed bars 120 in the other half of the plate. The output light mask 115 includes a similar plate 121 having vertically extending slits 122 with interposed bars 123 in one half, and in the other half a plurality of slits 124 separated by intervening bars 125. When the light modulating medium 45 is undeformed, light from source 110 passes through the slits 117 and 119 of the input mask and the light from each slot illuminates the entire raster area of the light modulating medium 14. The light from the modulating medium when it is undeformed is imaged by lens 113 on the bars 123 and 125 of the output mask 115. A green filter 126 is superimposed over the slots 117 to limit the light transmitted through the medium by these slots to green light. This means that the output mask including slots 122 and bars 123 need only control the amplitude of the light transmitted in accordance with the intensity of the green as determined by the depth of the deformations along the raster line corresponding to the green color information. In a similar manner a magenta filter 127 overlays the slots 119 of the input mask 112 so that the light which is passed by the slots 122 is selected by the output masking system in cooperation with the diffraction gratings established along the raster lines in accordance with the red and blue color information. The projection lens 114 images the medium on the screen 128.

It will be appreciated that the particular system for intelligence modulating the electron beam and projecting the information written on the medium by the beam is not of itself essential to the present invention but is described and illustrated here since the focusing and deflection system of the present invention finds its greatest utility in systems requiring a minimum of aberration of the electron beam over an area scanned by the beam. These characteristics are of particular value in intelligence modulated beam systems.

It will be apparent to those skilled in the art from the detailed description of FIGS. 1–4 of the present application that changes and modifications may be made in the particular structure and circuit without departing from my invention in its broader aspects. For example, the focus electrode 36, which is operated at ground potential in the modification shown, which is the same voltage as the modulating medium, may be omitted entirely and the focusing field produced between the deflection electrode set 27 and the modulating medium if the quality of the focus thus obtained is satisfactory to the needs of the application of the invention. Also particularly when the predeflection is accomplished by the centering electrodes as described above, a modified form of the deflection and focusing electrodes may be utilized which may be structurally simpler. Such an embodiment of my invention is shown schematically in FIG. 5. In this arrangement, the centering electrodes are utilized not only for beam centering and cross section shaping, but for the predeflection as described in connection with FIG. 4. In such an embodiment, the predeflection electrode set 26 of FIG. 1 may become a simple focusing ring. In the embodiment shown in FIG. 5, the focusing ring 36 and a focusing ring occupying the position of the predeflection electrode set 26 of FIG. 1 is incorporated in a single surrounding electrode 147. Electrode 147 is operated at ground potential and insulated from the deflection electrode set 27, the electrodes of which have been shown of less thickness than the electrodes of set 27 in FIG. 1 and are supported by the lead-in conductors through the glass cylindrical wall. It will be appreciated that the conducting cylinder 147 may be formed as a separate cylinder supported from the glass wall or in suitable cases it may be formed as illustrated as a conductive coating on the glass wall. In any event, clearance will be provided for the lead-in conductors of the deflection electrodes so that they may be operated at voltages which are independent of the cylindrical electrode 147. The operation of this embodiment is believed apparent from the foregoing detailed description of FIG. 4, it being understood that focusing is accomplished by electrode 147 as an alternative to the electrode sets 26, 27 and ring electrode 36. The predeflection is accomplished by the centering electrodes 128.

While I have described and claimed a particular embodiment of my invention, it will be apparent to those skilled in the art that changes and modifications may be made without departing from my invention in its broader aspects and I aim, therefore, in the appended claims to cover all such changes and modifications as fall within the true spirit and scope of my invention.

What I claim as new and desire to secure by Letters Patent of the United States Patent Office is:

1. An electron beam deflection and focusing system comprising an electron source, an electron receiving surface, means accelerating electrons emanating from said source toward said electron receiving surface and electrostatic means interposed between said source and said electron receiving surface for focusing said electrons and deflecting them over an area of said electron receiving surface, said electrostatic means comprising a first set of four electrodes and a second set of four electrodes longitudinally spaced therefrom in the direction of electron travel with the electrodes of each set of four electrodes having their centers lying substantially in a single plane transverse to the electron path between said source and said electron receiving surface and with said four electrodes of each set positioned to provide orthogonally arranged pairs of electrodes, additional electrode means surrounding the electron path interposed between said electron receiving surface and said second set of electrodes, means for maintaining said additional electrode means and said first set of electrodes at a direct current voltage which is substantially positive with respect to the direct current voltage applied said second set of electrodes to focus the electrons traveling from said source to said electron receiving surface, means applying deflection voltages to the opposed pairs of electrodes in both of said sets of electrodes to deflect said beam over an area of said electron receiving surface, the deflection produced by said first set of electrodes in response to the deflection voltages applied thereto providing a predeflection of the beam in the same direction as caused by said second set of deflecting electrodes to compensate for the asymmetry of the focusing field produced by the deflection voltages on said second set of deflection electrodes and thereby minimize the deflection aberration at said electron receiving surface.

2. An electron beam deflection and focusing system comprising an electron source, an electron receiving surface, means accelerating electrons emanating from said source toward said electron receiving surface and electrostatic means interposed between said source and said electron receiving surface for focusing said electrons and deflecting them over an area of said electron receiving surface comprising a first set of four electrodes and a second set of four electrodes longitudinally spaced therefrom in the direction of electron travel with the electrodes of each set of four electrodes having their centers lying substantially in a single plane transverse to the electron path between said source and said electron receiving surface and with said four electrodes of each set positioned to provide orthogonally arranged pairs of electrodes, electrode means positioned between said second set of electrodes and said electron receiving surface, means for maintaining said first set of electrodes and said electrode means at a direct current voltage which is substantially positive with respect to the direct current voltage applied to said second set of electrodes to focus the electrons traveling from said source to said electron receiving surface, means applying deflection voltages to the opposed pairs of electrodes in both of said sets of electrodes to deflect said beam over an area of said electron receiving surface, the deflection produced by said first set of electrons providing a predeflection of the beam in the same direction as caused by said second set of deflecting electrodes to compensate for the asymmetry of the focusing field produced by the deflection voltages on said second set of deflection electrodes and thereby minimize the deflection aberration at said electron receiving surface.

3. An electron beam deflection and focusing system comprising an electron source, an electron receiving surface, means accelerating electrons emanating from said source toward said electron receiving surface and electrostatic means interposed between said source and said electron receiving surface for focusing said electrons and deflecting them over an area of said electron receiving surface comprising a first set of four electrodes and a second set of four electrodes longitudinally spaced therefrom in the direction of electron travel with the electrodes of each set of four electrodes having their centers lying substantially in a single plane transverse to the electron path between said source and said electron receiving surface and with said four electrodes of each set positioned to provide orthogonally arranged pairs of electrodes, electrode means positioned between said second set of electrodes and said electron receiving surface, means for maintaining said first set of electrodes and said electrode means at a direct current voltage which is substantially positive with respect to the direct current voltage applied said second set of electrodes to focus the electrons traveling from said source to said electron receiving surface, means applying deflection voltages to the opposed pairs of electrodes in both of said sets of electrodes to deflect said beam over an area of said electron receiving surface, the deflection produced by said first set of electrons providing a predeflection of the beam in the same direction as caused by said second set of deflecting electrodes to compensate for the asymmetry of the focusing field produced by the deflection voltages on said second set of deflection electrodes and thereby minimize the deflection aberration at said electron receiving surface.

4. An electron beam deflection and focusing system comprising an electron source, an electron receiving surface, means accelerating electrons emanating from said source toward said electron receiving surface and electrostatic means interposed between said source and said electron receiving surface for focusing said electrons and deflecting them over an area of said electron receiving surface comprising a first set of four electrodes and a second set of four electrodes longitudinally spaced therefrom in the direction of electron travel with the electrodes of each set of four electrodes having their centers lying substantially in a single plane transverse to the electron path between said source and said electron receiving surface and with said four electrodes of each set positioned to provide orthogonally arranged pairs of electrodes, electrode means positioned between said second set of electrodes and said electron receiving surface, means for maintaining said first set of electrodes and said electrode means at a direct current voltage which is substantially positive with respect to the direct current voltage applied to said second set of electrodes to focus the electrons traveling from said source to said electron receiving surface, means applying deflection voltages to the opposed pairs of electrodes in both of said sets of electrodes to deflect said beam over an area of said electron receiving surface, the deflection produced by said first set of electrons providing a predeflection of the beam in the same direction as caused by said second set of deflecting electrodes to compensate for the asymmetry of the focusing field produced by the deflection voltages on said second set of deflection electrodes and thereby minimize the deflection aberration at said electron receiving surface, the electrodes of said first set being substantially closer to the undeflected path of electrons accelerated from said electron source to said electron receiving surface than said second set of electrodes, and means for applying voltages to said first set of electrodes for centering the flow and controlling the cross section shape of said flow of electrons from said source to said receiving surface.

5. An electrostatic electron beam deflection and focusing system comprising an electron receiving surface and an electron source for providing and accelerating an electron beam toward said electron receiving surface, and electrostatic means surrounding the path of said electron beam between said source and said electron receiving surface including first and second sets of four deflection electrodes each longitudinally spaced along the beam path with the centers of the electrodes of each set lying in substantially the same plane transverse to the direction of the beam path and each set including two orthogonally arranged pairs of electrodes, additional electrode means interposed between the second of said sets of deflection electrodes and said electron beam receiving surface, means maintaining said last-mentioned electrode means and said first and second sets of longitudinally spaced deflection electrodes at relative direct current voltages to provide a three element electrostatic lens, means applying deflection voltages to said second set of electrodes to scan said beam in two directions over an area of said electron receiving surface and means applying deflection voltages to said first set of deflection electrodes to produce predeflection of said beam in said two directions to compensate for the distortion of the focusing field produced by the application of deflection voltages to said second set of deflection electrodes to minimize deflection aberration of said beam as it is deflected over an area of said electron beam receiving surface.

6. An electrostatic electron beam deflection and focusing system including an electron beam receiving surface, an electron beam source for producing and accelerating an electron beam toward said electron beam receiving surface, a first set of four electrodes arranged in two orthogonal pairs interposed between said source and said electron beam receiving surface about the undeflected beam path and having the centers thereof lying in substantially the same transverse plane, focusing electrode means interposed between said set of four electrodes and said electron beam receiving surface, and additional electrode means interposed between said set of four electrodes and said electron beam source including a second set of four electrodes having their centers lying in substantially the same transverse plane, means energizing said first set of four electrodes with deflection voltages to deflect said beam over an area of said electron receiving surface, means for energizing said second set of four electrodes with deflection voltages providing predeflection of said beam before it enters the field of said first set of four electrodes in the same direction as produced by said first set of four electrodes, said first set of four electrodes being energized by a direct current voltage substantially negative with respect to the direct current voltage applied to said second set of four electrodes and to said additional electrode means to provide electrostatic focusing fields, said predeflection operating to compensate for the effect of the deflection voltages applied to said first set of deflection electrodes on the focusing field to minimize deflection aberration of said electron beam at said electron receiving surface.

7. An electrostatic electron beam deflection and focusing system comprising an electron receiving surface and an electron source for providing and accelerating an electron beam toward said electron receiving surface, and electrostatic means surrounding the path of said electron beam between said source and said electron receiving surface including first and second sets of four electrodes each longitudinally spaced along the beam path with the centers of each set lying in substantially the same plane transverse to the direction of the beam path and each set including two orthogonally arranged pairs of electrodes, additional electrode means interposed between the second of said sets of electrodes and said electron beam receiving surface, means applying direct current voltages of such relative magnitudes to said last-mentioned electrode means and said first and second sets of longitudinally spaced deflection electrodes as to provide a three element electrostatic lens, means applying a deflection voltage to at least one opposed pair of the set of four electrodes nearer said electron receiving surface to provide deflection of said beam in one direction across said surface and means applying a deflection voltage to a corresponding opposed pair of the other set of electrodes to provide for deflection of said beam in a direction to compensate for the distortion of the focusing field produced by the application of the deflection voltage to the set of electrodes nearer said electron receiving surface to minimize deflection aberration of said beam as it is deflected over said electron beam receiving surface.

8. An electrostatic electron beam deflection and focusing system comprising an electron receiving surface and an electron source for providing and accelerating an electron beam toward said electron receiving surface, and electrostatic means surrounding the path of said electron beam between said source and said electron receiving surface including first and second sets of four electrodes each longitudinally spaced along the beam path with the centers of each set lying in substantially the same plane transverse to the direction of the beam path and each set including two orthogonally arranged pairs of electrodes, electrode means adjacent said electron receiving surface, said electrode means and said first and second sets of longitudinally spaced deflected electrodes providing a three element electrostatic lens and means applying a deflection voltage to at least one pair of said first set of electrodes to provide for deflection of said beam in a direction to compensate for the distortion of the focusing field produced by the application of a deflection voltage to at least a pair of said second set of electrodes to minimize deflection aberration of said beam as it is deflected over an area of said electron beam receiving surface.

9. An electrostatic electron beam deflection and focusing system comprising an electron receiving surface and an electron source for providing and accelerating an electron beam toward said electron receiving surface, and electrostatic means surrounding the path of said electron beam between said source and said electron receiving surface including first and second sets of four electrodes each longitudinally spaced along the beam path with the centers of each set lying in substantially the same plane transverse to the direction of the beam path and each set including two orthogonally arranged pairs of electrodes, electrode means adjacent said electron receiving surface, said electrode means and said first and second sets of longitudinally spaced deflection electrodes providing a three element electrostatic lens and means applying a deflection voltage to at least one pair of said first set of electrodes to provide for deflection of said beam in a direction to compensate for the distortion of the focusing field produced by the application of a deflection voltage to at least a pair of said second set of electrodes to minimize deflection aberration of said beam as it is deflected over an area of said electron beam receiving surface, the electrodes of said first set being substantially closer to the undeflected path of said beam than said second set of electrodes.

10. An electrostatic electron beam deflection and focusing system including an electron beam receiving surface, an electron beam source for producing and accelerating an electron beam toward said electron beam receiving surface, a set of four electrodes arranged in two orthogonal pairs interposed between said source and said electron beam receiving surface about the undeflected beam path and having the centers thereof lying in substantially the same transverse plane, focusing electrode means interposed between said set of four electrodes and said electron beam receiving surface, and additional electrode means interposed between said set of four electrodes and said electron beam source including a second set of four electrodes having their centers lying in substantially the same transverse plane, means energizing at least one opposed pair of said first set of four electrodes with a deflection voltage to deflect said beam over said electron receiving surface, means for energizing two electrodes of said second set of four electrodes with a deflection voltage providing predeflection of said beam before it enters the field of said first set of four electrodes, said first set of four electrodes being energized by a direct current voltage substantially negative with respect to the direct current voltage applied to said focusing electrode means and to said additional electrode means to provide electrostatic focusing fields, said predeflection operating to compensate for the effect of the deflection voltage applied to said first set of four electrodes on the focusing field to minimize deflection aberration of said electron beam at said electron receiving surface.

11. An electrostatic electron beam deflection and focusing system comprising an electron receiving surface and an electron source for providing and accelerating an electron beam toward said electron receiving surface, and electrostatic means surrounding the path of said electron beam between said source and said electron receiving surface including a set of four electrodes including two orthogonally arranged pairs of electrodes with the centers of each electrode of the set lying in substantially the same transverse plane, additional electrode means interposed between said set of electrodes and said electron beam receiving surface and between said set of electrodes and said electron source and cooperating therewith to provide a three element electrostatic lens and means applying a deflection voltage to at least one of said orthogonally arranged pairs of electrodes, and means applying a deflection voltage to said additional electrode means and a source of energizing voltage therefor to provide a predeflection of said electron beam.

12. An electrostatic electron beam deflection and focusing system comprising an electron receiving surface and an electron source for providing and accelerating an electron beam toward said electron receiving surface, and electrostatic means surrounding the path of said electron beam between said source and said electron receiving surface including a set of four electrodes including two orthogonally arranged pairs of electrodes with the centers of each electrode of the set lying in substantially the same transverse plane, and additional electrode means interposed between said set of electrodes and said electron beam receiving surface and between said set of electrodes and said electron source and cooperating therewith to provide a three element electrostatic lens and means applying a deflection voltage to at least one of said orthogonally arranged pairs of electrodes, a second set of four electrodes between said source and said additional electrode means adjacent said source including two orthogonally arranged pairs of electrodes with the centers of each electrode of the set lying in substantially the same transverse plane, and means to apply a deflection voltage to said second set of four electrodes to provide a predeflection of said electron beam.

13. An electrostatic electron beam deflection and focusing system including an electron beam receiving surface, an electron beam source, means for producing and accelerating an electron beam toward said electron beam receiving surface including a first set of four electrodes arranged in two orthogonal pairs interposed between said source and said electron beam receiving surface about the undeflected beam path and having the centers thereof lying in substantially the same transverse plane, a cylindrical electrode surrounding said set of four electrodes and extending beyond said set in the direction of said electron beam source and in the direction of said electron beam receiving surface, a second set of four electrodes interposed between said cylindrical electrode and said electrode beam source, means energizing at least one opposed pair of said first set of four electrodes with a deflection voltage to deflect said beam over said electron receiving surface, means for energizing a corresponding pair of said second set of four electrodes with a deflection voltage providing predeflection of said beam before it enters the field of said first set of four electrodes, said first set of four electrodes being energized by a direct current voltage substantially negative with respect to the direct current voltage applied to said cylindrical electrode to provide electrostatic focusing fields, said predeflection operating to compensate for the effect of the deflection voltage applied to said first set of four electrodes on the focusing filed to minimize deflection aberration of said electron beam at said electron receiving surface.

References Cited by the Examiner

UNITED STATES PATENTS 3,170,083 2/1965 Newberry ---------- 315—17 X

DAVID G. REDINBAUGH, *Primary Examiner.*

T. A. GALLAGHER, *Assistant Examiner.*